United States Patent [19]
Luo

[11] 3,777,226
[45] Dec. 4, 1973

[54] PROGRAMMABLY VARIABLE CAPACITOR FOR USE IN A CAPACITIVE FUNCTION GENERATOR

[75] Inventor: Zong-Shyong Luo, Plymouth, Mich.

[73] Assignee: Burroughs Corporation, Detroit, Mich.

[22] Filed: Oct. 2, 1972

[21] Appl. No.: 294,351

[52] U.S. Cl. ............................. 317/249 R, 323/74
[51] Int. Cl. .................................................. H01g 5/01
[58] Field of Search ............. 317/249 R, 251, 249 T

[56] References Cited
UNITED STATES PATENTS

| | | | |
|---|---|---|---|
| 1,569,003 | 1/1926 | Curtis | 317/249 R |
| 2,578,429 | 12/1951 | Karplus | 317/249 R |
| 3,500,146 | 3/1970 | Sargent | 317/249 R |
| 3,289,057 | 11/1966 | Melanson | 317/249 T |

FOREIGN PATENTS OR APPLICATIONS

| | | | |
|---|---|---|---|
| 454,845 | 10/1936 | Great Britain | 317/249 R |

Primary Examiner—E. A. Goldberg
Attorney—Paul W. Fish et al.

[57] ABSTRACT

A programmably variable capacitor is provided having capacitive values which vary as functionally determined by preselected variations in the physical properties of a dielectric which is translatable along a path central to plates of the capacitor, the capacitive variations providing, when a fixed electric potential is applied across a series circuit including the capacitor and a resistor, a variation in the electric current flow which is representative of the capacitive value of the capacitor.

4 Claims, 5 Drawing Figures

PATENTED DEC 4 1973  3,777,226

3,777,226

PROGRAMMABLY VARIABLE CAPACITOR FOR USE IN A CAPACITIVE FUNCTION GENERATOR

BACKGROUND OF THE INVENTION

The invention relates to variable capacitors in general and more particularly to capacitors, the capacitive values of which vary by virtue of changes in the properties of their dielectrics.

Prior art discloses several types of variable capacitors. The most common type includes those having at least one electrically conductive plate which is movable with respect to another to thereby increase or decrease the distance therebetween. Since the capacitance of the capacitor is a function of this distance, it varies as the plate is moved. While it may be desirable for many applications, it is unfortunate for others that a uniform input motion imparted to a movable plate will produce a capacitive variation simplistically proportional thereto. A more complex capacitive variation normally requires the impartation of compound motion to the movable plate, the generation of such motions being proportionally complex and expensive to provide and maintain. Another type, one that is far less common, includes those capacitors having a fluid dielectric. The capacitive value of these capacitors is varied by changing the pressure and temperature of the dielectric fluid. It should be obvious that this method has many disadvantages, such as requiring heating and cooling devices to alter the temperature or pressure or vacuum pumps to alter the pressure. The rate of change of capacitive values using these methods is also substantially limited due to the rather cumbersome equipment required.

A third type of variable capacitor, one that is more closely related to the present invention, includes those having a solid dielectric which normally takes the form of a plate or disk and is operably rotated into and out of the space between a pair of fixed electrically conductive plates. Like the first type, a rather simplistic variation in capacitance is obtained for any uniform input motion imparted thereto, a compound motion being required to produce more complex capacitive variations.

SUMMARY OF THE INVENTION

The invention resides in the provision of a capacitor having a movable dielectric, the properties of which are preselectably varied in the direction of motion, the dielectric being formed into a right circular cylinder for endless angular translation between electrically conductive plates of the capacitor or alternately formed into an elongated strip for linear translation therebetween.

Accordingly, it is an object of the present invention to provide a programmably variable capacitor which is capable of relatively complex variations in capacitance as a result of simple, uniform, input motion.

Another object of the invention is to provide a capacitor which is capable of relatively rapid changes in its capacitance.

Yet another object of the invention is to provide a capacitor which is relatively inexpensive to construct and maintain.

An important aspect of the invention is the use of a movable dielectric to vary the capacitive values of a capacitor in accordance with a predetermined function, the function being represented by variations in the physical properties of the dielectric material in the direction of its motion.

Another important aspect of the invention is the use of the variable capacitor and a resistor electrically coupled in series therewith to vary current flow when a fixed voltage is applied to the series circuit, the variations being a function of the preselected variations of the physical properties of the dielectric material of the capacitor.

BRIEF DESCRIPTION OF THE DRAWINGS

These and other objects, aspects and advantages of the invention will be more clearly understood from the following description when read in conjunction with the accompanying drawings, in which.

DETAILED DESCRIPTION OF THE INVENTION

Figure 3:
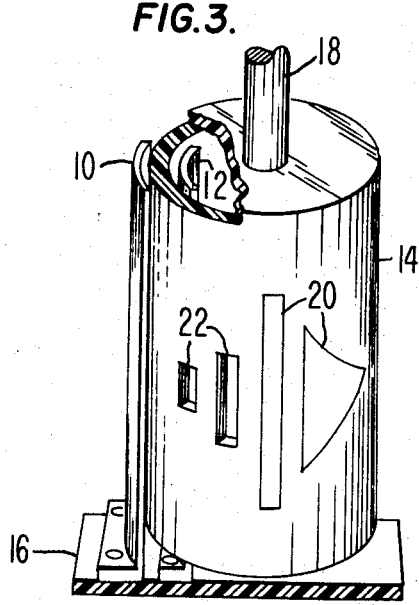
FIG. 3 is a perspective view, partially fragmented, of a programmably variable capacitor embodying features of the invention.

The programmably variable capacitor shown in FIG. 3 has a first electrode means or plate 10, a second electrode means or plate 12 and a dielectric means 14. The first and second plates are electrically conductive and have arcuately apposed surfaces. The plates are disposed upon an electrically insulating support 16 such that the effective surface of the first plate 10 is curvilinearly parallel to and spaced apart from the associated appositional surface of the second plate 12. The dielectric 14 is formed of dielectric material in the shape of a right circular cylinder and is rotatably mounted by way of a shaft 18 such that its axis of rotation and the axis of curvature of the arcuate plates 10 and 12 are coincident, the cylindrical wall of the dielectric 14 passing effectively between the first and second plates 10 and 12. The dielectric material itself is specifically inhomogeneous, its dielectric properties being selectively varied in the direction of its intended rotation. The variations in dielectric properties may be effected by way of inserts of material having different properties as illustrated by the segments 20, by deleting portions of the dielectric as illustrated at 22 or by blending materials having different properties to form the cylindrical dielectric.

Another embodiment of the programmably variable capacitor is shown in FIG. 5 and again has a first electrode means or plate 24, a second electrode means or plate 26 and a dielectric means 28. The first and second plates 24 and 26 are electrically conductive and have planarly apposed surfaces. The plates are disposed upon an electrically insulating support 30 such that the effective surface of the first plate 24 is parallel to and spaced apart from the associated appositional surface of the second plate 26. The dielectric 28 is formed of dielectric material in an elongated strip and is disposed to be movable along its longitudinal axis central to the planarly apposed plates 24 and 26. The dielectric material used in this embodiment is also specifically inhomogeneous, its dielectric properties being selectively varied in the direction of its intended motion. As with the previously described dielectric 14 (FIG. 3), the variations in dielectric properties may be effected by way of inserts of material having different properties as illustrated by the segments 32, by deleting portions of the dielectric as illustrated at 34 or by blending materials having different properties to form the dielectric strip.

Figure 4:
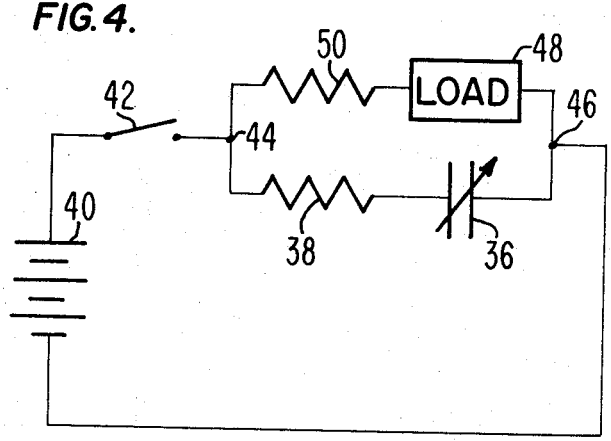
FIG. 4 is a schematic representation of a capacitive function generator employing the programmably variable capacitor of FIG. 3 and is shown operably coupled to a representative load.

The schematic representation of a capacitance function generator shown in FIG. 4 has a programmably variable capacitor 36 as previously described electrically connected in series to a resistor 38. This series circuit is operably connected to a source of electrical potential as illustrated at 40 by a switch 42. A first terminal 44 is provided at the juncture of the resistor 38 and the switch 42, and a second terminal 46 is provided at the juncture of the capacitor 36 and the source of electrical potential 40 for the purpose of attaching a load as represented at 48, a resistor 50 being shown in series therewith for balancing purposes.

OPERATION OF THE INVENTION

Figure 1:
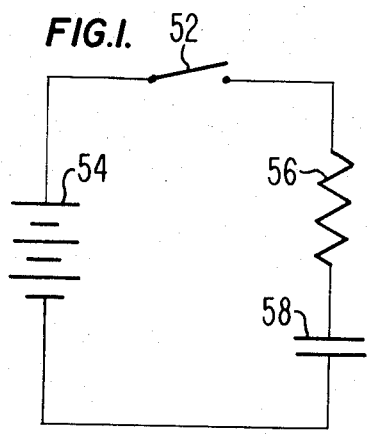
FIG. 1 is a schematic representation of a basic, series, resistance-capacitance circuit.
Figure 2:
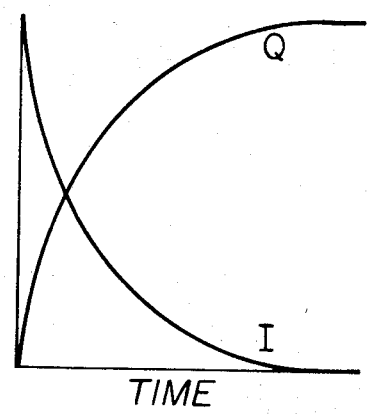
FIG. 2 is a graphic representation of a typical charging characteristic of the capacitor shown in FIG. 1.

The basic, series, resistance-capacitance circuit of FIG. 1 is shown in conjunction with the graph of FIG. 2 to illustrate the charging characteristic of a typical capacitor. As the switch 52 is actuated, an electrical potential supplied by the battery 54 is applied across the series-connected resistor 56 and capacitor 58. At first, the capacitor 58 offers a relatively low impedance to the flow of current through the circuit and hence begins to charge rapidly, as indicated by the Q-curve, representing electrical charge, on the graph. As the electrical charge on the capacitor increases, however, the impedance offered to the flow of current through the circuit increases proportionally. The rate of increase of the electrical charge decreases with time as the impedance increases until the total charge eventually reaches some maximum value; and the amount of current flowing, represented by the I-curve on the graph, decreases until it eventually reaches zero. As shown by the graph, both charge Q and current I, with respect to the circuit of FIG. 1, are a function of time. These values are also a function of the capacitive value of the capacitor, as may be illustrated mathematically by the equations $$I = (E_o/R) e^{-T/RC}$$

and $$Q = \int_0^T I \, dT$$

where $E_o$ and $R$ are constant values.

The programmably variable capacitor shown in FIG. 3 may be utilized in two basic modes of operation. It may be preset to a desired capacitive value and used as a fixed, but adjustable, capacitor; and it may be used as a continuously varying capacitor. In the fixed mode, it may be set to a particular capacitance by rotating the shaft 18, which in turn rotates the cylindrical dielectric 14, until that configuration of dielectric material is disposed between the conductive plates 10 and 12 which will provide the capacitive value desired. In the continuously varying mode, either a constant or a predeterminately varying angular force may be applied to the shaft 18 by any one of a number of well-known, constant-speed or programmably variable-speed electric motors respectively to rotate the cylindrical dielectric, the capacitance being continuously varied thereby as a function of both the angular velocity of the cylindrical dielectric 14 and of the preselected variations in the dielectric properties thereof.

Figure 5:
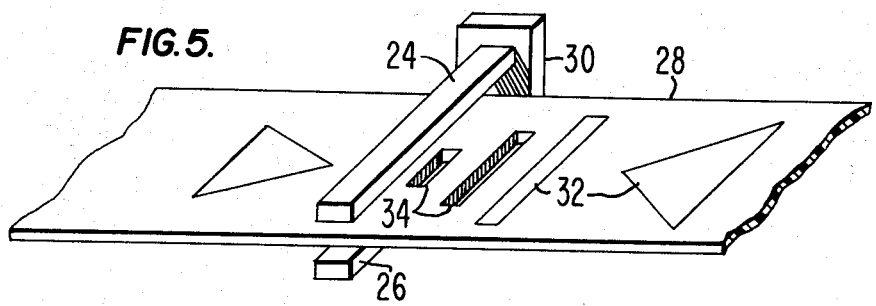
FIG. 5 is a perspective view of an additional embodiment of a programmably variable capacitor embodying features of the invention.

The programmably variable capacitor shown in FIG. 5 may be utilized in the same two basic modes of operation. It also may be preset to a desired capacitive value and used as a fixed, but adjustable, capacitor; and it may be used as a continuously varying capacitor. In the fixed mode, it may be set to a particular capacitance by longitudinally moving the strip of dielectric material 28 until that configuration of dielectric material is disposed between the conductive plates 24 and 26 which will provide the capacitive value desired. In the continuously varying mode, either a constant or a predeterminately varying linear force may be applied to the dielectric strip 28 by any one of a number of well-known constant-speed or programmably variable-speed electric motors respectively, their angular output force being applied to the strip by way of conventional drive rollers or the like, the capacitance being continuously varied thereby as a function of both the linear velocity of the dielectric strip and of the preselected variations in the dielectric properties thereof.

The circuit shown in FIG. 4 is an application of the programmably variable capacitors of FIGS. 3 or 5 as a capacitance function generator. When the switch 42 is actuated, the electric potential from the source 40 is applied across the series combination of the resistor 38 and the programmably variable capacitor 36. Thus far, this circuit will react in a manner similar to that of the circuit of FIG. 1. When the dielectric material is moved along its path of travel between the conductive plates of the capacitor 36, however, the capacitance of the latter will vary as a function of the preselected variations in the dielectric properties of the moving dielectric. As shown by the previous equation, the electric current flowing will also vary as a function of the capacitance of the capacitor. These variations will be effectively and influentially felt in a circuit connected across the series combination of the resistor 38 and the capacitor 36, here represented by the load 48 and balance resistor 50 shown connected in series across the first and second terminals 44 and 46. Typical applications of such a circuit would be in motor controls, sensing circuits and feed back control loops.

While the programmably variable capacitor and the capacitive function generator have been shown and described in considerable detail, it should be understood that many changes and variations may be made therein without departing from the spirit and scope of the invention.

What is claimed is:

1. A programmably variable capacitor comprising:
   a first electrically conductive electrode having a first arcuately shaped surface,
   a second electrically conductive electrode having a second arcuately shaped surface, said second arcuately shaped surface being curvilinearly parallel to and spaced apart from said first arcuately shaped surface, and
   dielectric means disposed effectively between said first and second electrode means for controlling an electric field therebetween upon the application of a first potential to said first electrode means and a different potential to said second electrode means, said dielectric means including a continuous loop of dielectric material forming a right circular cylinder, said cylinder being rotatable between said first and second arcuately shaped surfaces about an axis coincident to the axis of curvature of said arcuately shaped surfaces, said loop of dielectric material including means for predeterminately varying the dielectric properties of said material in the direction of rotation of said right circular cylinder.

2. The programmably variable capacitor of claim 1 wherein said means for predeterminately varying the dielectric properties of said material includes insert means having different dielectric properties from said material.

3. The programmably variable capacitor of claim 1 wherein said means for varying the dielectric properties includes aperture means formed by deleting portions of said dielectric material.

4. A programmably variable capacitor as defined by claim 1 wherein the angular velocity of said cylinder of dielectric material about its longitudinal axis is constant.

* * * * *